US012722552B2

(12) United States Patent
Yoshida et al.

(10) Patent No.: US 12,722,552 B2
(45) Date of Patent: Sep. 1, 2026

(54) VEHICLE

(71) Applicant: YAMAHA HATSUDOKI KABUSHIKI KAISHA, Iwata (JP)

(72) Inventors: Masahiro Yoshida, Shizuoka (JP); Kohei Miyara, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 286 days.

(21) Appl. No.: 18/622,457

(22) Filed: Mar. 29, 2024

(65) Prior Publication Data

US 2024/0326675 A1 Oct. 3, 2024

(30) Foreign Application Priority Data

Mar. 31, 2023 (JP) ................................ 2023-059549

(51) Int. Cl.

*B60N 3/06* (2006.01)
*B62J 25/04* (2020.01)
*B62K 5/01* (2013.01)

(52) U.S. Cl.

CPC ................ *B60N 3/06* (2013.01); *B62J 25/04* (2020.02); *B62K 5/01* (2013.01)

(58) Field of Classification Search

CPC . B62J 25/00; B62J 25/04; B62J 25/06; B62K 5/01; B60N 3/06
USPC ............................................ 296/75; 280/291
See application file for complete search history.

(56) References Cited

U.S. PATENT DOCUMENTS

| | | | | |
|---|---|---|---|---|
| 4,451,057 A * | 5/1984 | Lawson | F02B 61/02 | 280/291 |
| 4,728,121 A * | 3/1988 | Graves | B62J 25/06 | 74/564 |
| 5,794,976 A * | 8/1998 | Stevicks | B62J 15/00 | 280/847 |
| 6,085,857 A * | 7/2000 | Horiuchi | B60K 5/00 | 180/311 |
| 6,113,121 A * | 9/2000 | Mizuta | B60N 3/06 | 280/164.2 |
| 6,116,630 A * | 9/2000 | Thomas | B62J 25/06 | 280/291 |
| 6,270,106 B1 * | 8/2001 | Maki | B62K 5/01 | 180/21 |

(Continued)

OTHER PUBLICATIONS

Kensuke Kamada; Tatsuya Tanaka. Vehicle. Yamaha Hatsudoki Kabushiki Kaisha. U.S. Appl. No. 18/622,499, filed Mar. 29, 2024.

(Continued)

*Primary Examiner* — Gregory A Blankenship
(74) *Attorney, Agent, or Firm* — Rabin & Berdo, P.C.

(57) ABSTRACT

A vehicle including: a main body frame; a seat provided on the main body frame; a pair of front wheels provided at a front portion of the main body frame; a pair of rear wheels provided at a rear portion of the main body frame; a pair of footrests respectively provided on two sides of the seat in a plan view of the vehicle, each of the footrests having a first step and a second step, the second step being provided behind the first step and extending diagonally upward and rearward; and a pair of first supporting frames connected with the main body frame and respectively supporting approximate centers of the pair of second steps from below.

10 Claims, 15 Drawing Sheets

(56) References Cited

U.S. PATENT DOCUMENTS

| | | | | |
|---|---|---|---|---|
| 6,502,863 | B1 * | 1/2003 | Takahashi | B62J 15/00 280/847 |
| 7,506,714 | B2 * | 3/2009 | Davis | F16F 9/512 180/311 |
| 7,594,671 | B2 * | 9/2009 | Danze | B62K 5/01 280/163 |
| 7,942,447 | B2 | 5/2011 | Davis et al. | |
| 8,091,657 | B2 * | 1/2012 | Dieter | F16H 57/0489 296/193.03 |
| 8,596,398 | B2 * | 12/2013 | Bennett | B62K 5/01 180/90.6 |
| 9,771,114 | B1 * | 9/2017 | Malsam | B62J 25/04 |
| 12,391,329 | B2 * | 8/2025 | Tanaka | B62J 25/06 |
| 2008/0246300 | A1 * | 10/2008 | Portelance | B62J 25/08 296/75 |
| 2009/0058146 | A1 * | 3/2009 | Kobayashi | B60N 2/015 296/204 |
| 2012/0025558 | A1 * | 2/2012 | Anderson | B62J 25/06 296/75 |
| 2012/0090908 | A1 * | 4/2012 | Bergman | F16D 13/58 180/90.6 |
| 2024/0326675 | A1 * | 10/2024 | Yoshida | B62J 25/06 |

OTHER PUBLICATIONS

Masahiro Yoshida. Vehicle. Yamaha Hatsudoki Kabushiki Kaisha. U.S. Appl. No. 18/622,530, filed Mar. 29, 2024.

Tatsuya Tanaka; Masahiro Yoshida. Vehicle. Yamaha Hatsudoki Kabushiki Kaisha. U.S. Appl. No. 18/622,617, filed Mar. 29, 2024.

* cited by examiner 10
68
84
16b
16a
44
20
46
26b
26a
R
L
Rr
Fr
32b
32a
22b
28b
28a
22a
30b
30a
18
12
14b
14a
56b
56a
82

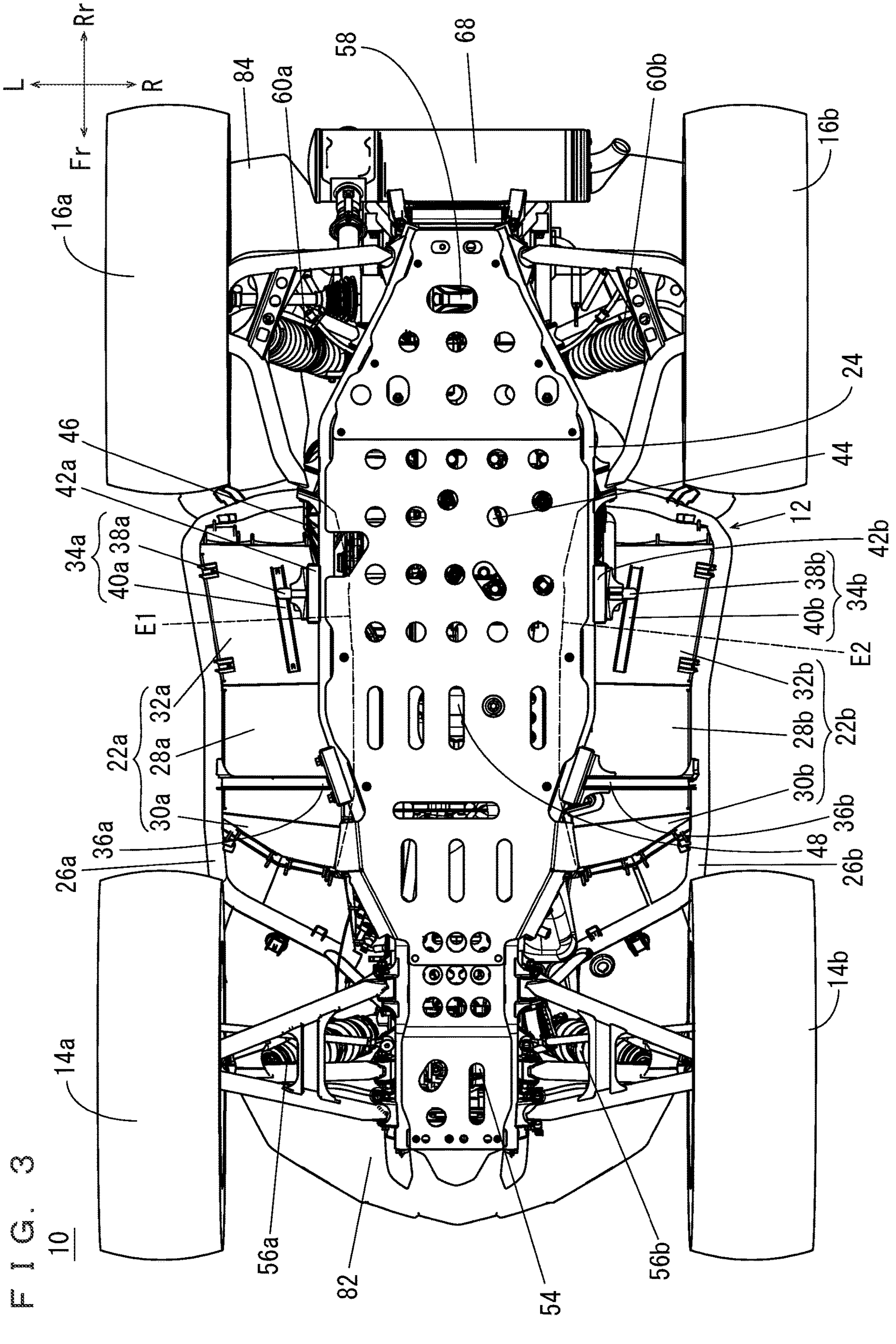
F I G. 3
10
Rr
L
R
Fr
84
60a
58
68
60b
16a
16b
24
46
42a
44
12
34a
38a
42b
40a
38b
40b
34b
E1
E2
22a
32a
32b
28a
28b
22b
30a
30b
36a
36b
48
26a
26b
14a
14b
56a
82
54
56b Rr
L
R
Fr
58
68
60b
60a
24
44
46
42a
42b
34a
38a
38b
34b
40a
40b
E1
E2
32a
32b
22a
28a
28b
22b
30a
30b
12
36a
36b
26a
26b
52
48
56a
56b
54

A-A section

VEHICLE

CROSS REFERENCE TO RELATED APPLICATIONS

This application is based upon and claims the benefit of priority of the prior Japanese Patent Application No. 2023-059549, filed on Mar. 31, 2023, the entire contents of which are incorporated herein by reference.

BACKGROUND OF THE INVENTION

Field of the Invention

The present invention relates to vehicles, and more specifically to a straddled vehicle such as an ATV (All Terrain Vehicle).

Description of the Related Art

As examples of conventional techniques of this kind, U.S. Pat. Nos. 7,942,447 and 8,091,657 disclose straddled vehicles.

The straddled vehicle according to U.S. Pat. No. 7,942,447 includes a saddle-type seat, a footrest on a side of the seat, and a frame supporting an outer side of the footrest.

The straddled vehicle according to U.S. Pat. No. 8,091,657 includes a saddle-type seat, a footrest on a side of the seat, and a frame supporting a horizontal portion of the footrest from below.

As described, U.S. Pat. Nos. 7,942,447 and 8,091,657 disclose a frame which supports an outer side of the footrest or a frame which supports a horizontal portion of the footrest from below, but do not disclose any arrangement to support a slanted portion of the footrest at an approximate center thereof from below, i.e., there is room for improvement in terms of design freedom of the frame and freedom in selecting a material for the footrest.

SUMMARY OF THE INVENTION

Therefore, a primary object of the present invention is to provide a vehicle having improved design freedom of a main body frame and freedom in selecting a material for a footrest.

According to an aspect of the present invention, there is provided a vehicle including a main body frame; a saddle-style seat provided in the main body frame; a pair of front wheels provided in a front portion of the main body frame; a pair of rear wheels provided in a rear portion of the main body frame; a footrest provided on a side of the seat in a plan view and having a first step and a second step, the second step being provided behind the first step and extending diagonally upward and rearward; and a first supporting frame connected with the main body frame and supporting an approximate center of the second step from below.

In the present invention, it is possible to support the approximate center of the second step, i.e., a slanted portion of the footrest, from below, with the first supporting frame which is connected with the main body frame. Therefore, it is possible to improve design freedom of the main body frame and freedom in selecting a material for the footrest.

Preferably, the footrest is composed of a resin. In this case, it is possible to form the footrest easily, in a light weight and at a low cost.

Further preferably, the first supporting frame is composed as a separate member from the main body frame. In this case, it is possible to attach the first supporting frame to the main body frame by means of bolt-on for example. This makes it easy to attach/detach such components as an engine, leading to improved serviceability.

Further, preferably, the first supporting frame includes a stay extending at least outward in the vehicle's width direction from a main body frame side and then bending upward. In this case, it is possible to widen a distance between such components as a continuously variable transmission which are surrounded by the main body frame and the stay. This makes easy to perform maintenance tasks of the components.

Preferably, the first supporting frame includes footrest support portion extending in a fore-aft direction and supporting the second step from below. In this case, the invention improves the stiffness of the footrest.

Further preferably, the footrest has an inboard end portion located above the main body frame to overlap the main body frame in a plan view. In this case, the stiffness of the footrest is further improved by supporting the footrest further with the main body frame.

Further, preferably, the vehicle further includes an outside supporting frame connected with the main body frame and supporting an outboard side of the footrest. In this case, the stiffness of the footrest is further improved by supporting the footrest further with the outside supporting frame.

Preferably, the vehicle further includes a second supporting frame supporting the first step from below. In this case, the stiffness of the footrest is further improved by supporting the first step from below with the second supporting frame.

Further preferably, the second supporting frame extends in the vehicle's width direction to connect the main body frame with the outside supporting frame. In this case, it becomes possible to simplify the arrangement by making the second supporting frame serve both in ensuring the stiffness of the main body frame and the outside supporting frame and in supporting the first step.

The above-described object and other objects, characteristics, aspects and advantages of the present invention will become clearer from the following detailed description of embodiments of the present invention to be made with reference to the attached drawings.

BRIEF DESCRIPTION OF THE DRAWINGS

FIG. 3 is a bottom view which shows the vehicle in FIG. 1.

DETAILED DESCRIPTION OF THE PREFERRED EMBODIMENTS

Figure 1:
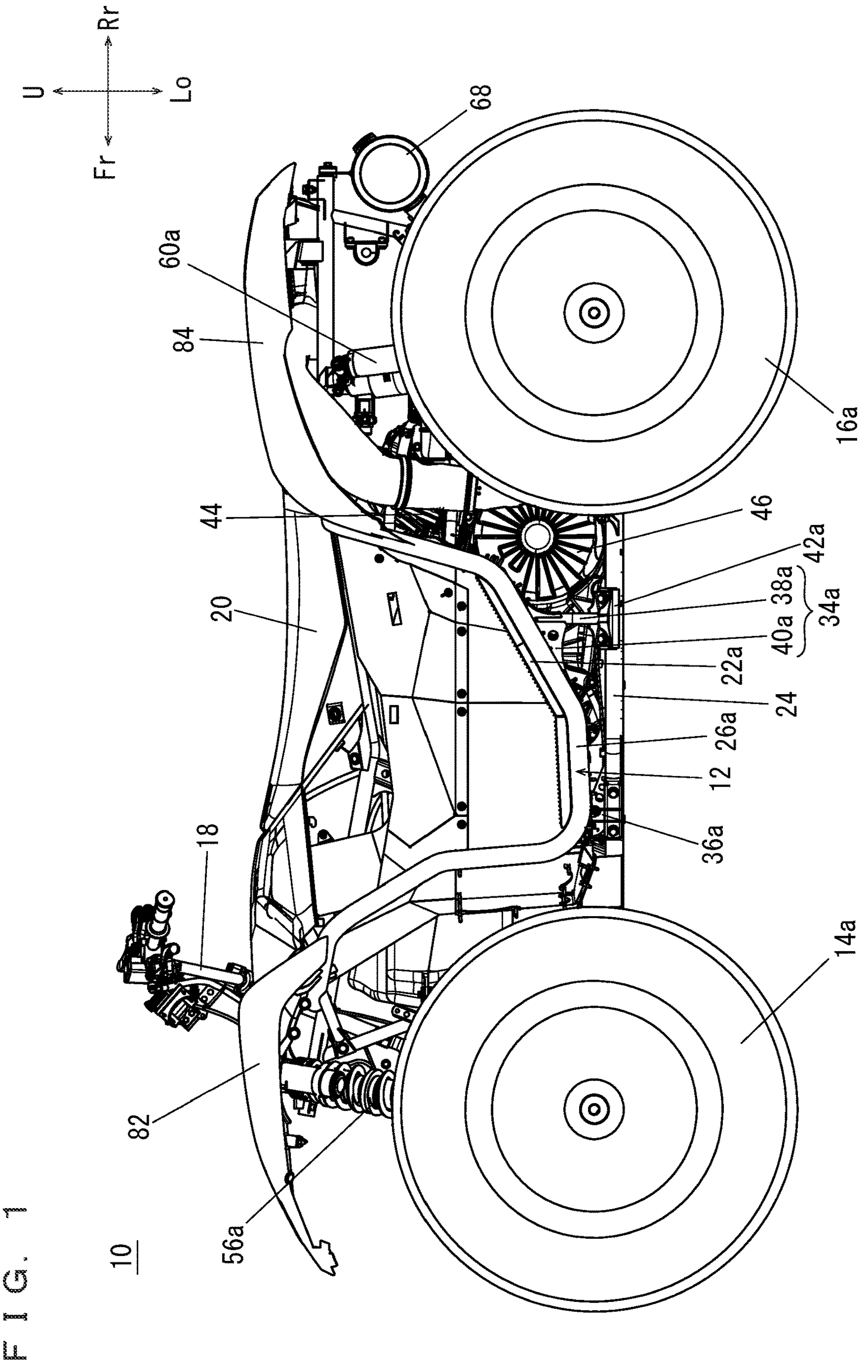
FIG. 1 is a side view which shows a vehicle according to an embodiment of the present invention.
Figure 2:
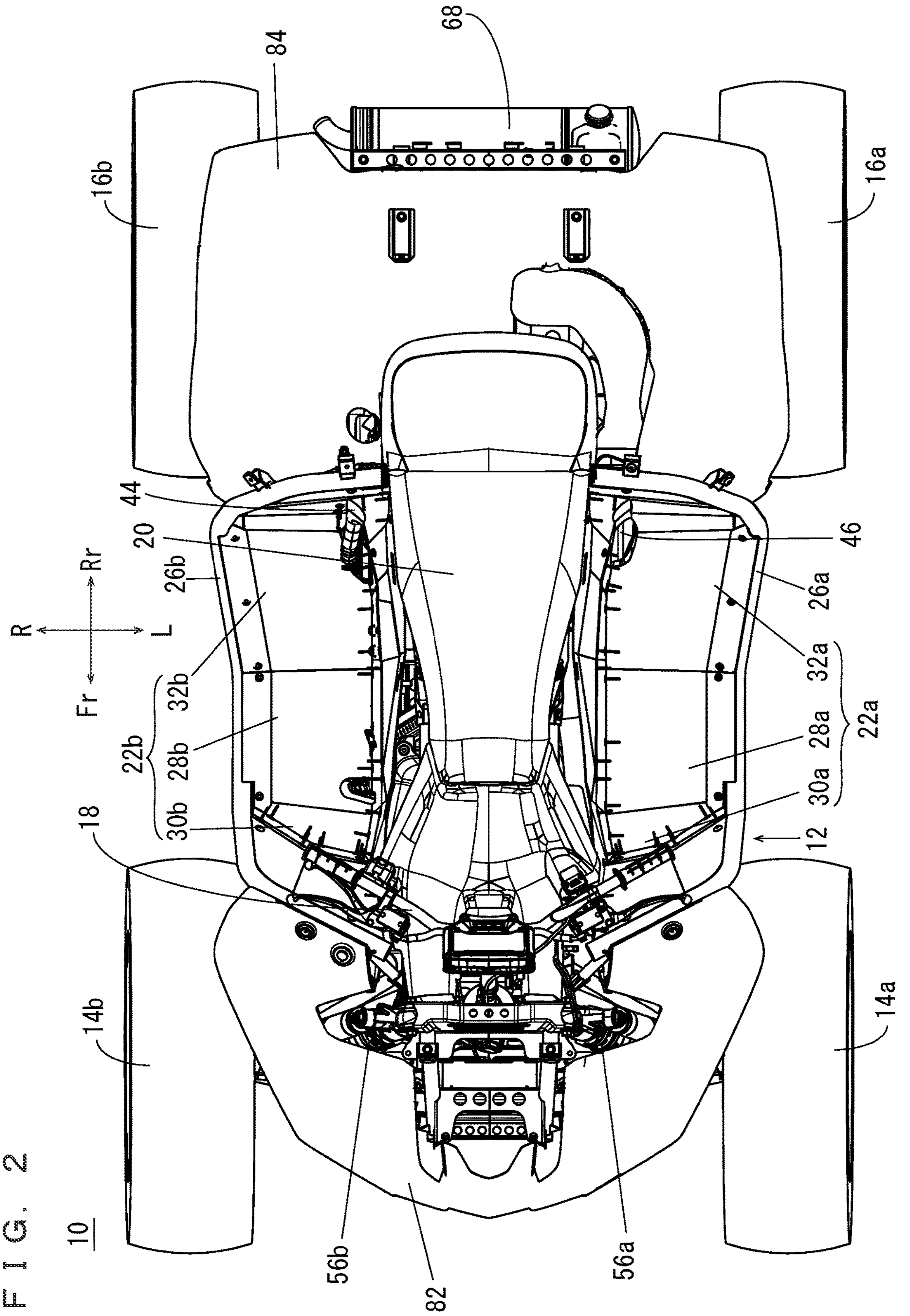
FIG. 2 is a plan view which shows the vehicle in FIG. 1.
Figure 4:
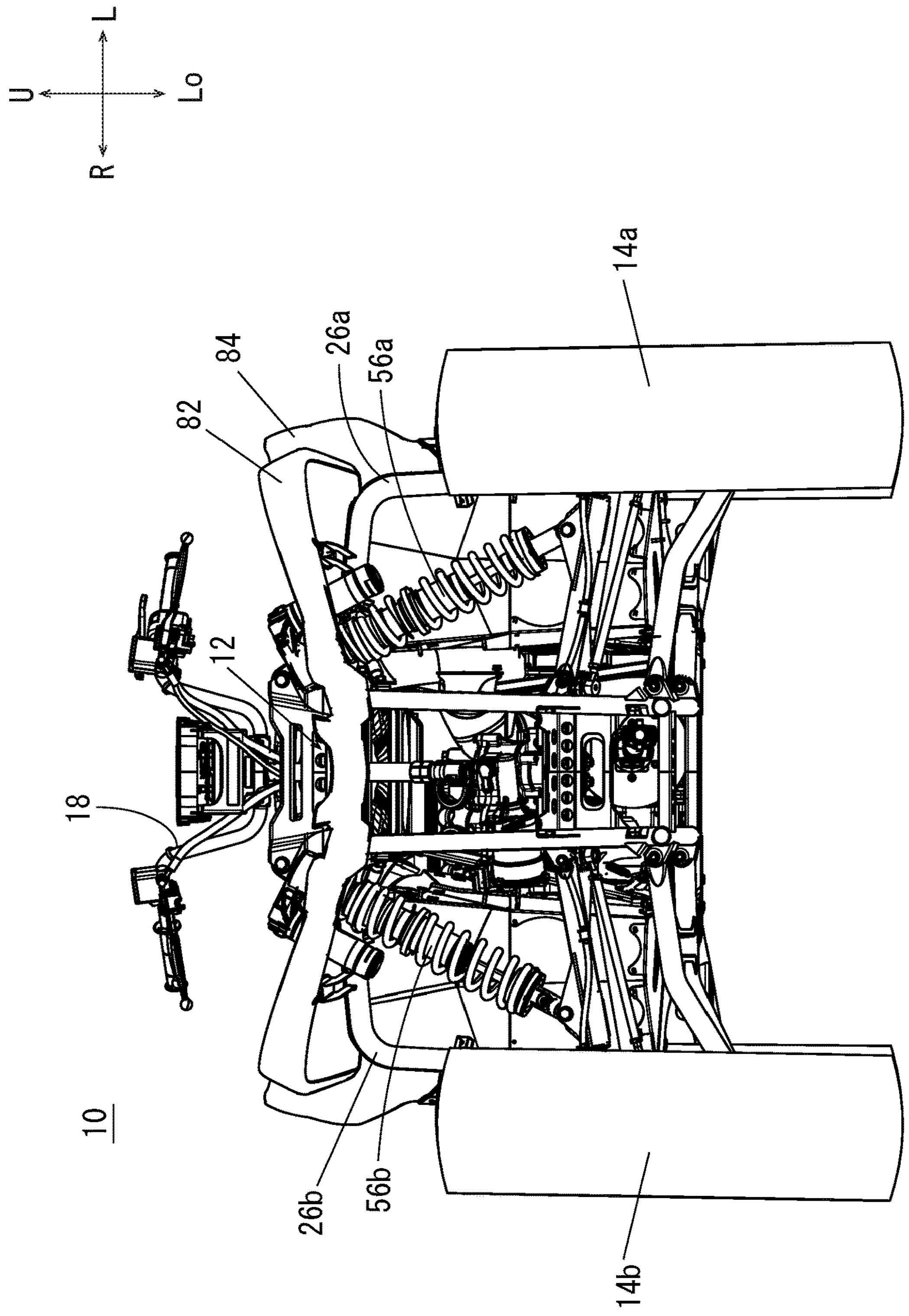
FIG. 4 is a front view which shows the vehicle in FIG. 1.
Figure 5:
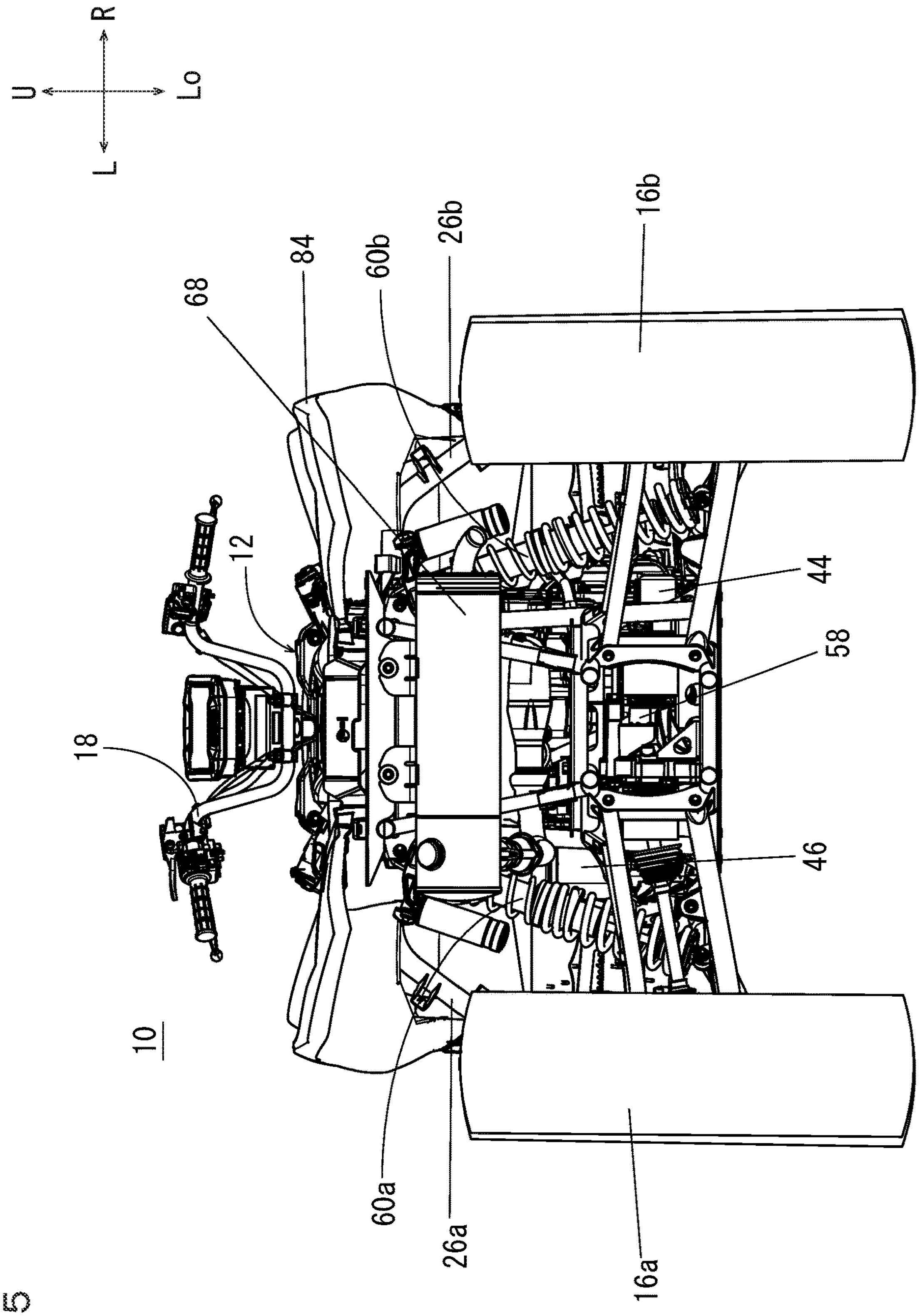
FIG. 5 is a rear view which shows the vehicle in FIG. 1.

Hereinafter, embodiments of the present invention will be described with reference to the drawings.

In the drawings, "Fr" indicates forward, "Rr" indicates rearward, "R" indicates rightward, "L" indicates leftward, "U" indicates upward and "Lo" indicates downward.

Referring to FIG. 1 through FIG. 5, a vehicle 10 according to an embodiment of the present invention is a straddled vehicle, and more specifically a four-wheeled ATV, which includes a body frame 12, a pair of front wheels 14*a*, 14*b*, a pair of rear wheels 16*a*, 16*b*, a bar handle 18, a saddle-style seat 20, and a pair of footrests 22*a*, 22*b*.

Figure 6:
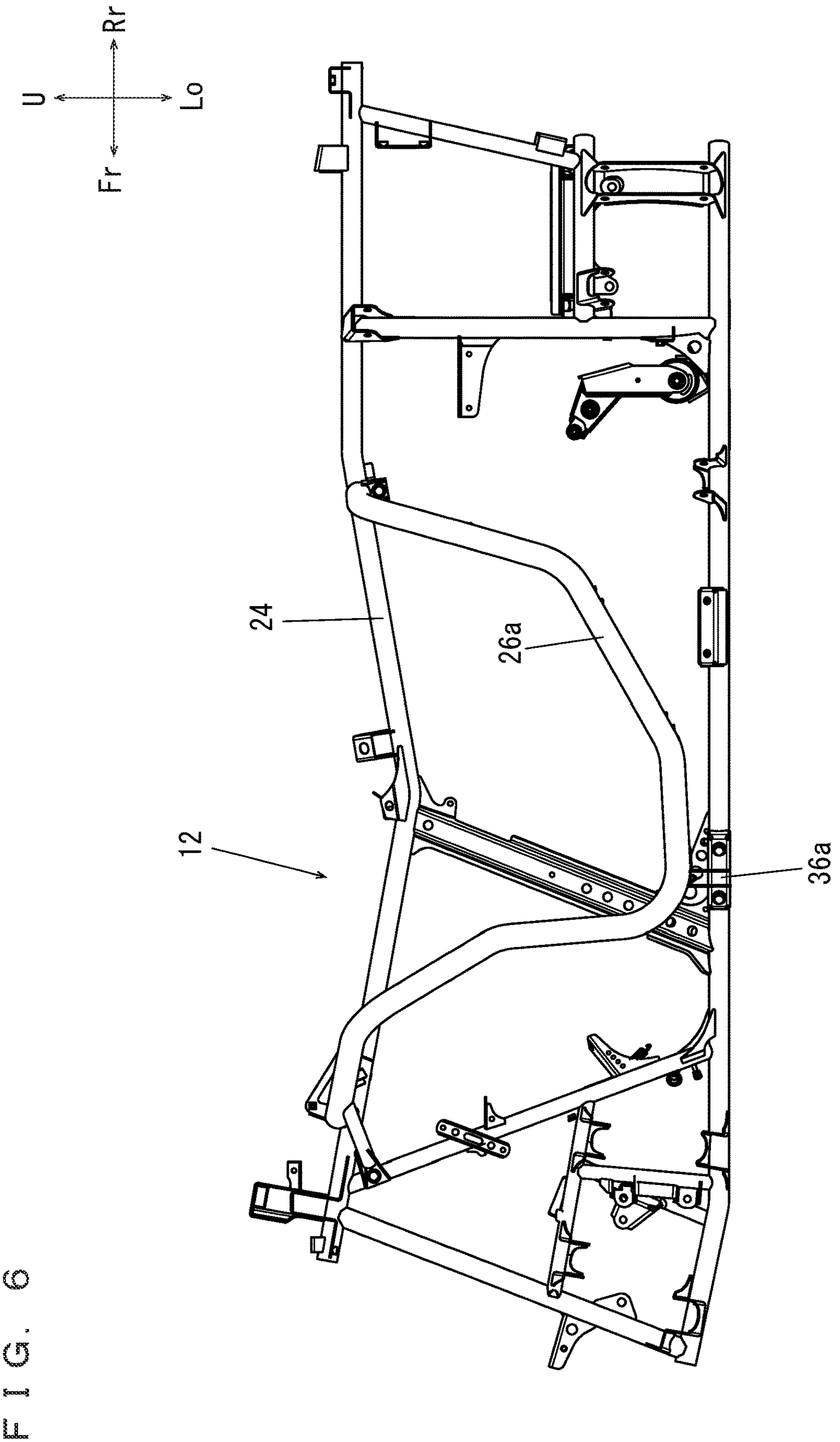
FIG. 6 is a side view which shows an arrangement of a body frame.
Figure 7:
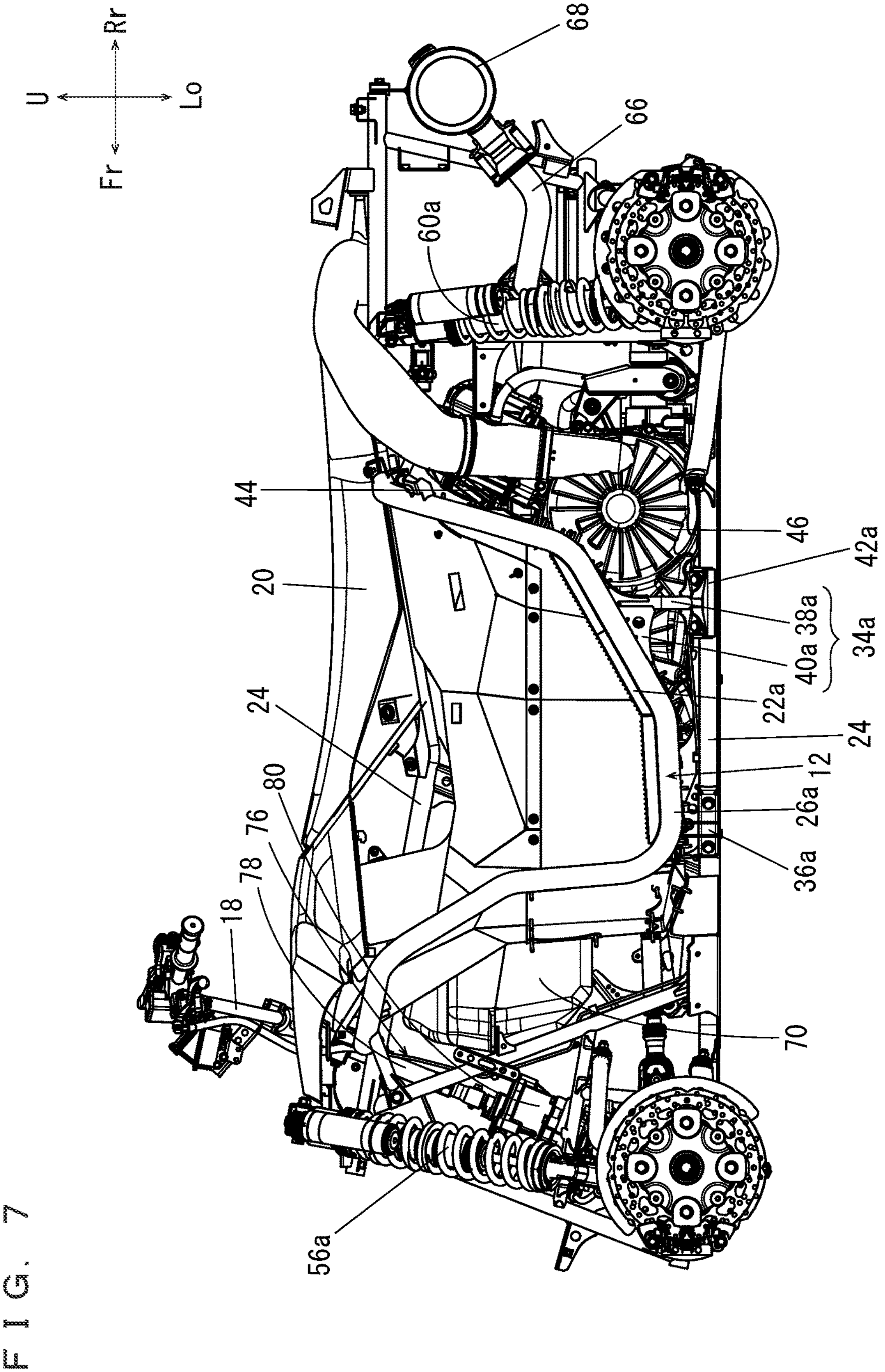
FIG. 7 is a side view which shows a state where wheels, a front fender, etc. are removed from the vehicle in FIG. 1.
Figure 8:
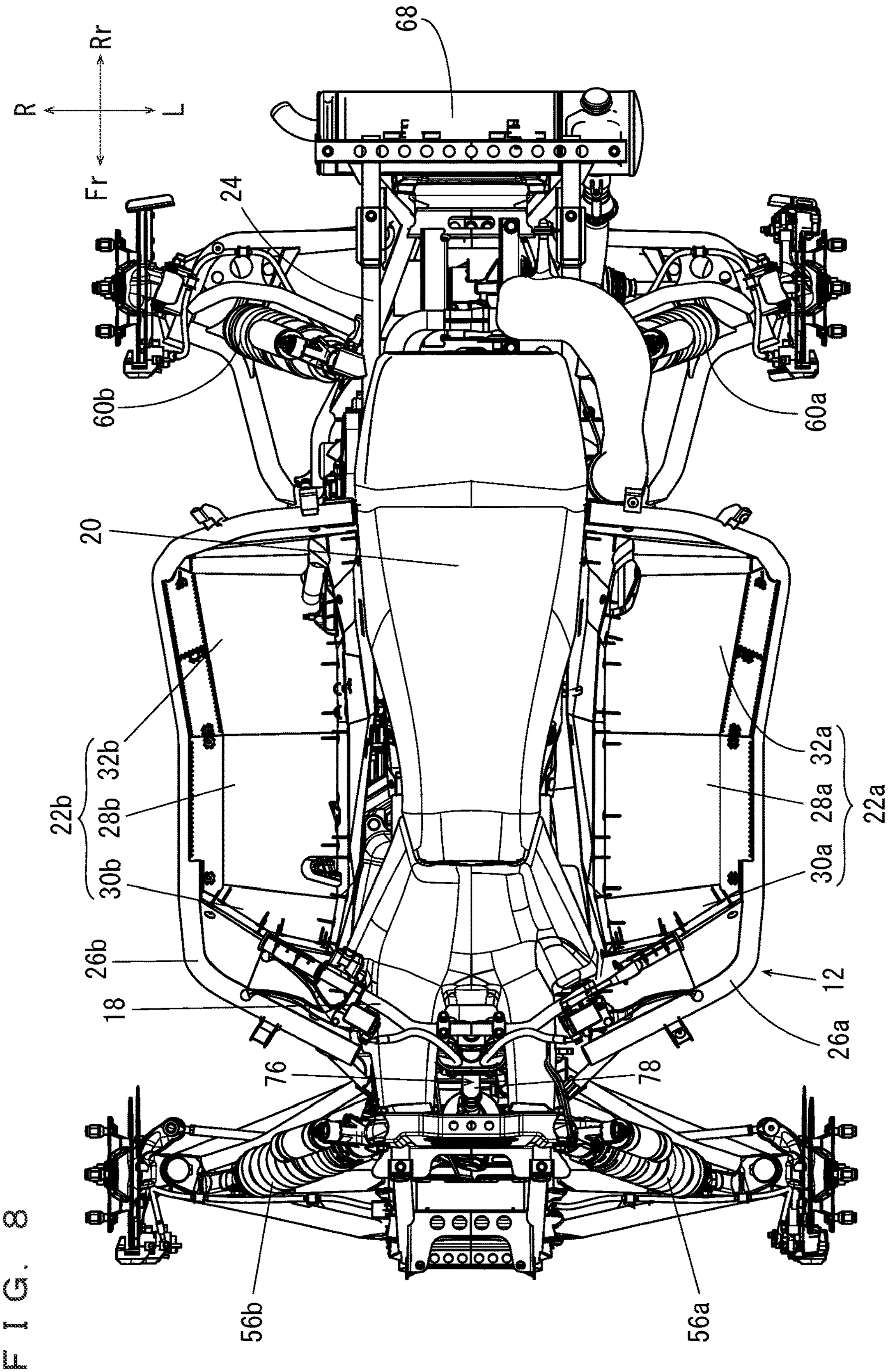
FIG. 8 is a plan view which shows a state where the wheels, the front fender, etc. are removed from the vehicle in FIG. 1.
Figure 9:
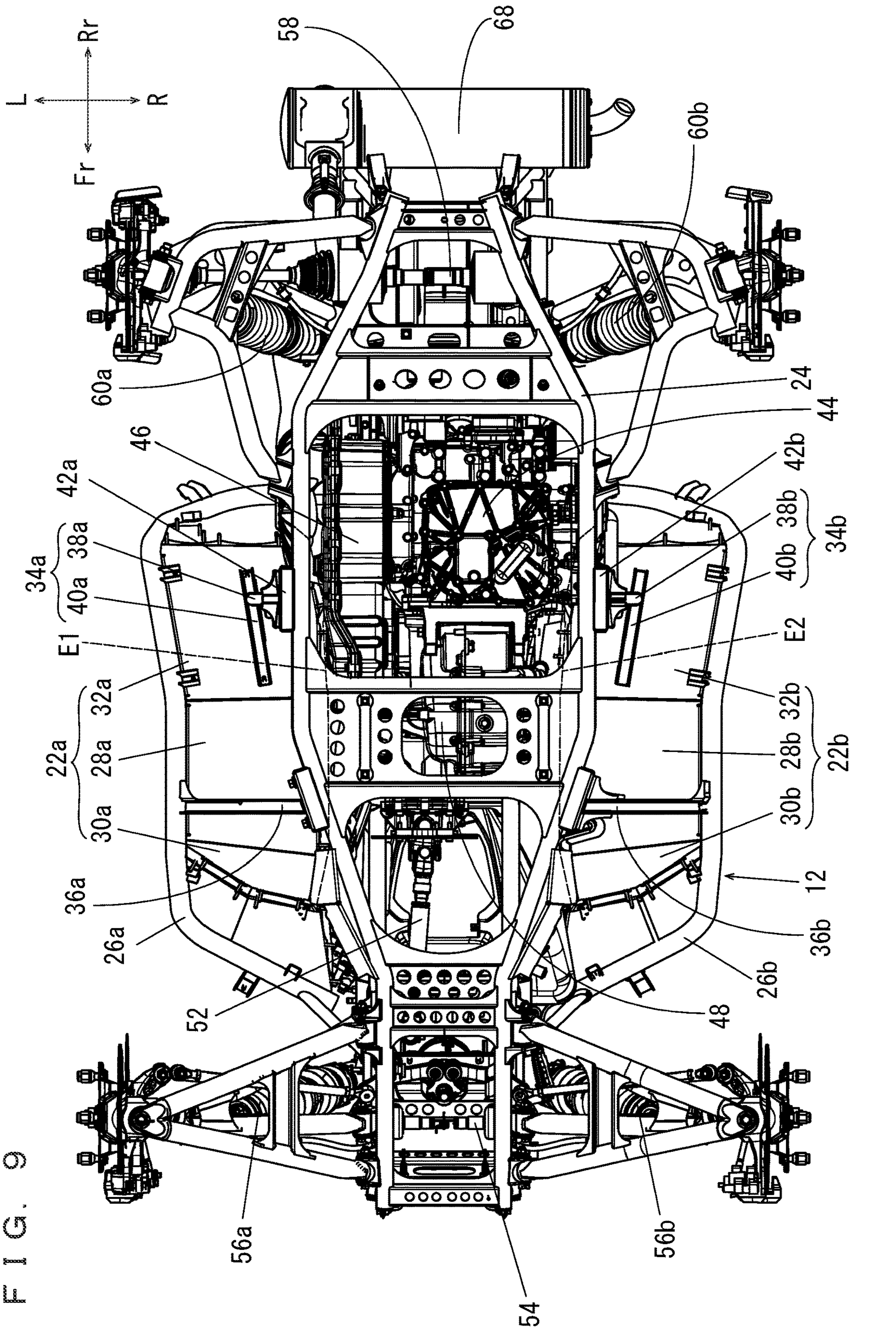
FIG. 9 is a bottom view which shows a state where the wheels, the front fender, etc. are removed from the vehicle in FIG. 1.
Figure 10:
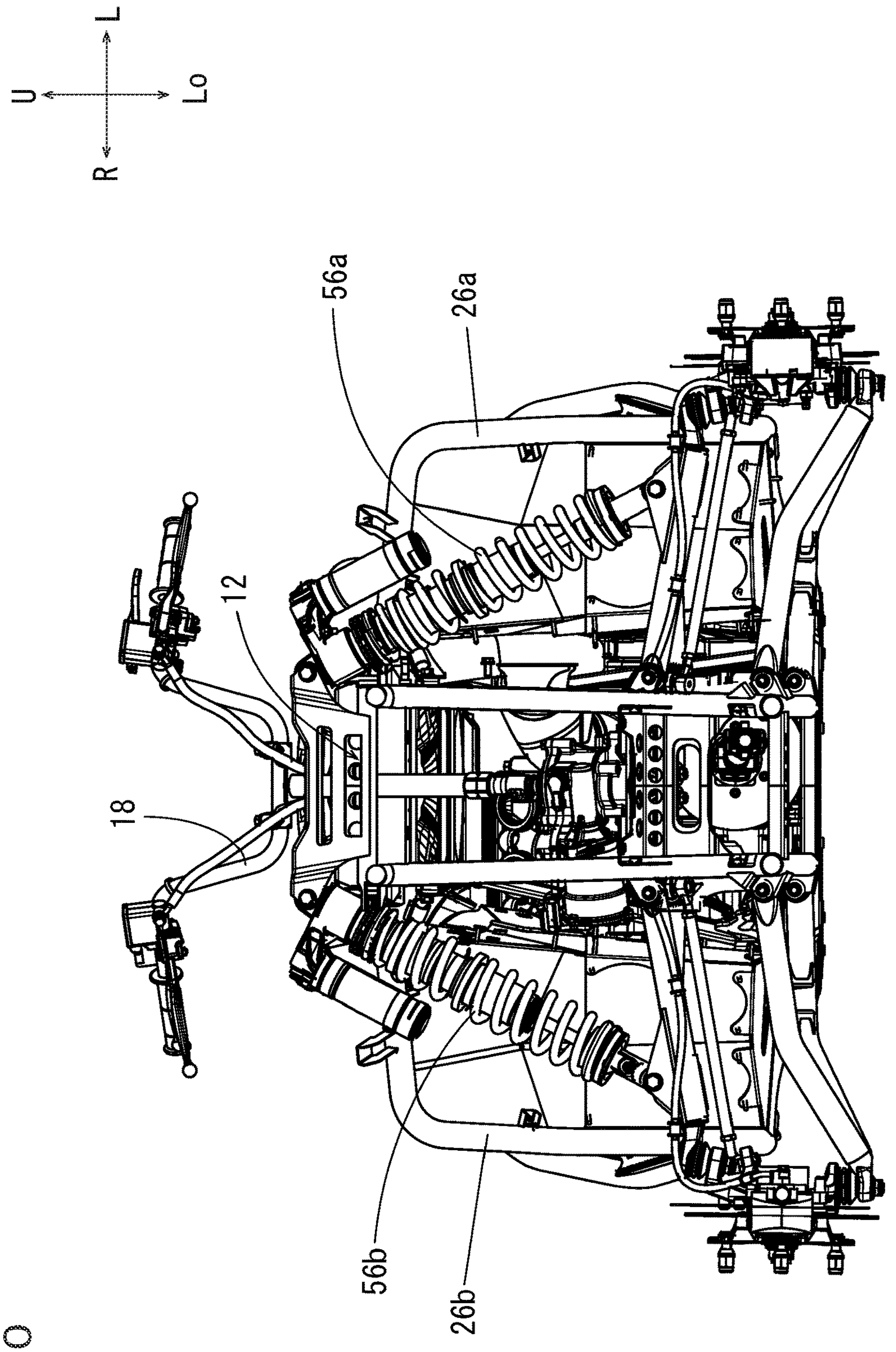
FIG. 10 is a front view which shows a state where the wheels, the front fender, etc. are removed from the vehicle in FIG. 1.
Figure 11:
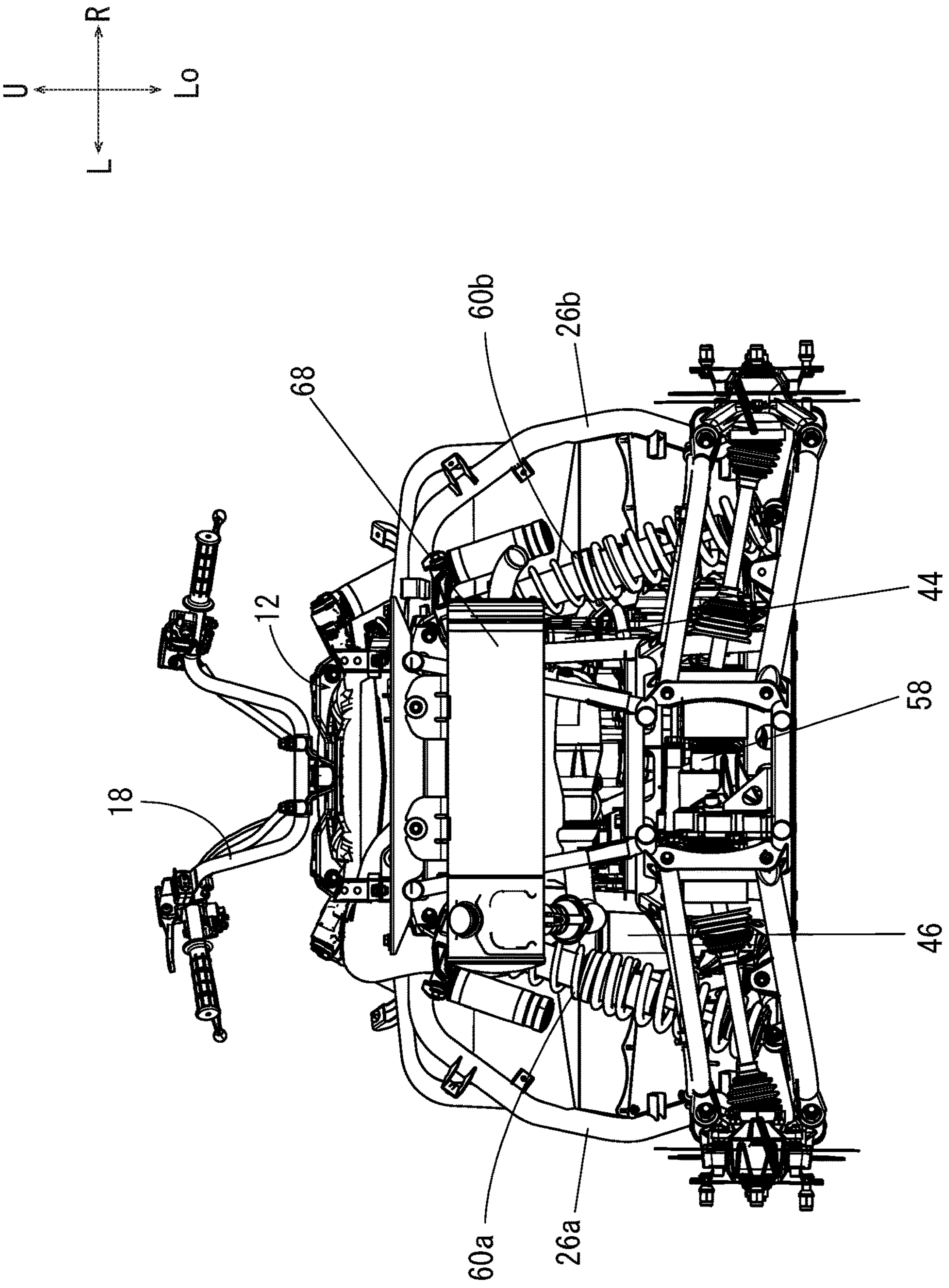
FIG. 11 is a rear view which shows a state where the wheels, the front fender, etc. are removed from the vehicle in FIG. 1.

Referring further to FIG. 6, the body frame 12 includes a main body frame 24 and outside supporting frames 26*a*, 26*b*. The outside supporting frames 26*a*, 26*b* are provided on respective sides of the main body frame 24. The outside supporting frames 26*a*, 26*b* are connected with the main body frame 24 respectively at both of their end portions to form a general shape of U in a plan view and in a side view. The outside supporting frames 26*a*, 26*b* support respective outer sides of the footrests 22*a*, 22*b*.

Referring also to FIG. 7 through FIG. 11, the pair of front wheels 14*a*, 14*b* are provided at a front portion of the main body frame 24 via a pair of suspensions 56*a*, 56*b* (which will be described later). The pair of rear wheels 16*a*, 16*b* are provided at a rear portion of the main body frame 24 via a pair of suspensions 60*a*, 60*b* (which will be described later). The bar handle 18 is provided in an intermediate region in the vehicle's width direction, connected at an upper portion of a steering shaft 78 (which will be described later), above the front wheels 14*a*, 14*b* in a side view. The seat 20 is provided at an intermediate portion in the vehicle's width direction, at a higher position than the front wheels 14*a*, 14*b* and the rear wheels 16*a*, 16*b*, between the front wheels 14*a*, 14*b* and the rear wheels 16*a*, 16*b* in a side view, and is supported by the main body frame 24. The pair of footrests 22*a*, 22*b*, serving as places where the rider puts his/her respective feet, are disposed in the body frame 12 between the front wheels 14*a*, 14*b* and the rear wheels 16*a*, 16*b* in a side view, i.e., they are provided in the main body frame 24 and on the outside supporting frames 26*a*, 26*b*.

The pair of footrests 22*a*, 22*b* are made of a resin for example, placed on sides of the seat 20 in a plan view, and includes center steps 28*a*, 28*b*, front steps 30*a*, 30*b* and rear steps 32*a*, 32*b* respectively. The footrests 22*a*, 22*b* have their respective inboard end portions E1, E2 located above the main body frame 24 to overlap the main body frame 24 in a plan view.

The center steps 28*a*, 28*b* are for the rider to put his/her feet when the vehicle body is horizontal, and are substantially horizontal when the vehicle body is horizontal. The front steps 30*a*, 30*b* are provided ahead of the respective center steps 28*a*, 28*b* and extend diagonally upward and forward. In other words, the front steps 30*a*, 30*b* incline diagonally upward and forward with respect to the respective center steps 28*a*, 28*b*. The rear steps 32*a*, 32*b* are provided behind the respective center steps 28*a*, 28*b* and extend diagonally upward and rearward. In other words, the rear steps 32*a*, 32*b* incline diagonally upward and rearward with respect to the respective center steps 28*a*, 28*b*. The rear steps 32*a*, 32*b* are portions where the rider can put his/her feet when the vehicle body is inclined.

Figure 12:
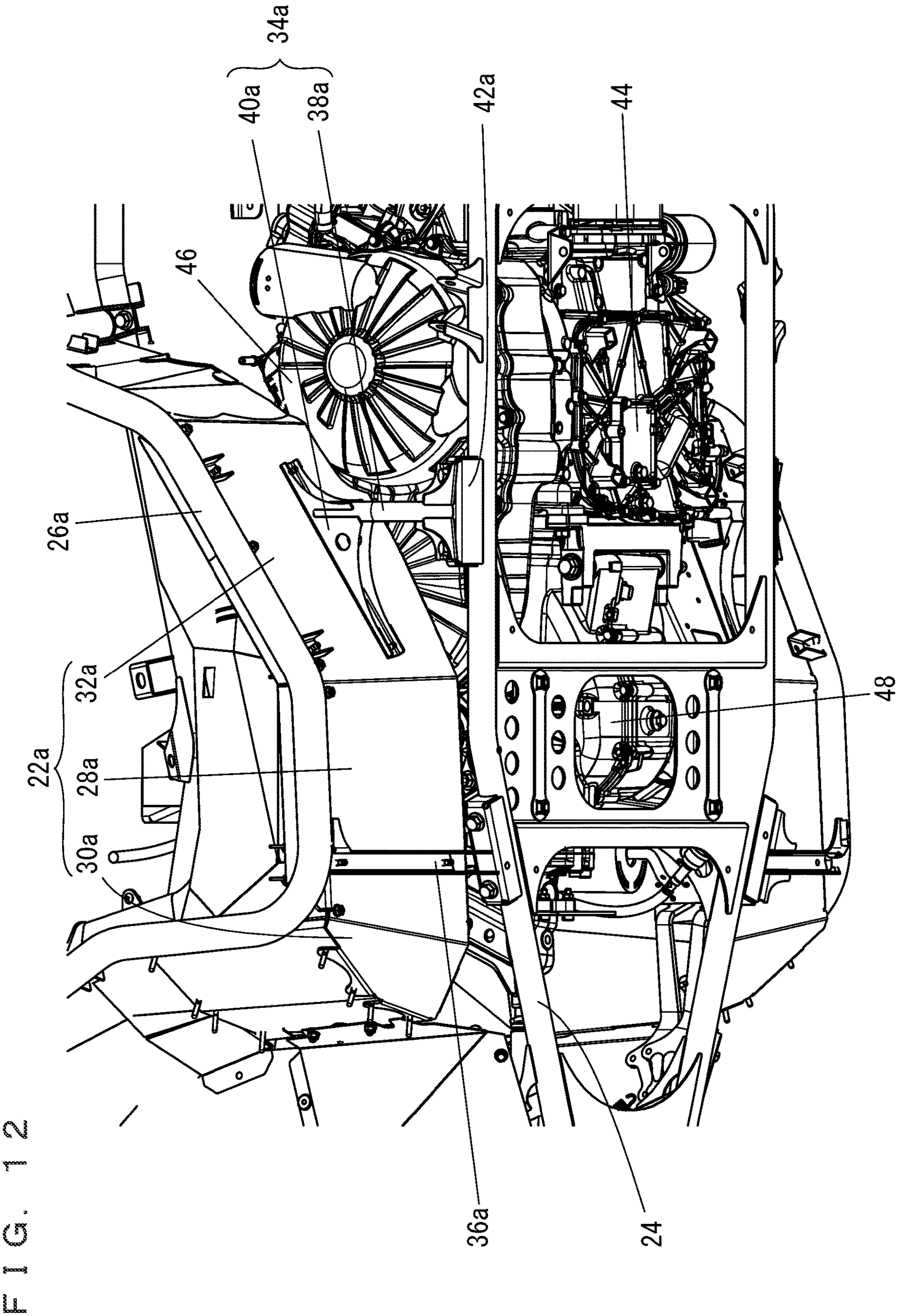
FIG. 12 is a perspective view which shows a lower surface of a foot rest and surrounds thereof.

Referring also to FIG. 12, the vehicle 10 further includes first supporting frames 34*a*, 34*b* and second supporting frames 36*a*, 36*b*.

The first supporting frames 34*a*, 34*b* are connected with the main body frame 24 and support approximate centers of the rear steps 32*a*, 32*b* respectively, from below. The first supporting frames 34*a*, 34*b* are composed as separate members from the main body frame 24. The first supporting frames 34*a*, 34*b* include, respectively, generally L-shaped stays 38*a*, 38*b* extending at least outward in the vehicle's width direction from a main body frame 24 side, and then bending upward; and footrest support portions 40*a*, 40*b* extending in a fore-aft direction to support the rear steps 32*a*, 32*b* from below. In the present embodiment, the stays 38*a*, 38*b* respectively extend diagonally outward and upward in the vehicle's width direction from the main body frame 24 side, and then bend upward. The footrest support portions 40*a*, 40*b* are attached to lower surfaces of the rear steps 32*a*, 32*b* respectively. The stays 38*a*, 38*b* have their respective upper end portions attached to the footrest support portions 40*a*, 40*b*. The stays 38*a*, 38*b* have their respective lower end portions attached to the main body frame 24 via brackets 42*a*, 42*b*. The second supporting frames 36*a*, 36*b* support the center steps 28*a*, 28*b* respectively, from below. The second supporting frames 36*a*, 36*b* respectively extend in the vehicle's width direction to connect the main body frame 24 with the outside supporting frames 26*a*, 26*b*. In other words, referring to FIG. 6, the outside supporting frames 26*a*, 26*b* have their respective lowermost portions supported by the main body frame 24 via the second supporting frames 36*a*, 36*b*. Therefore, the outside supporting frames 26*a*, 26*b* are each supported at three points: at both end portions and at the lowermost portion.

Figure 13:
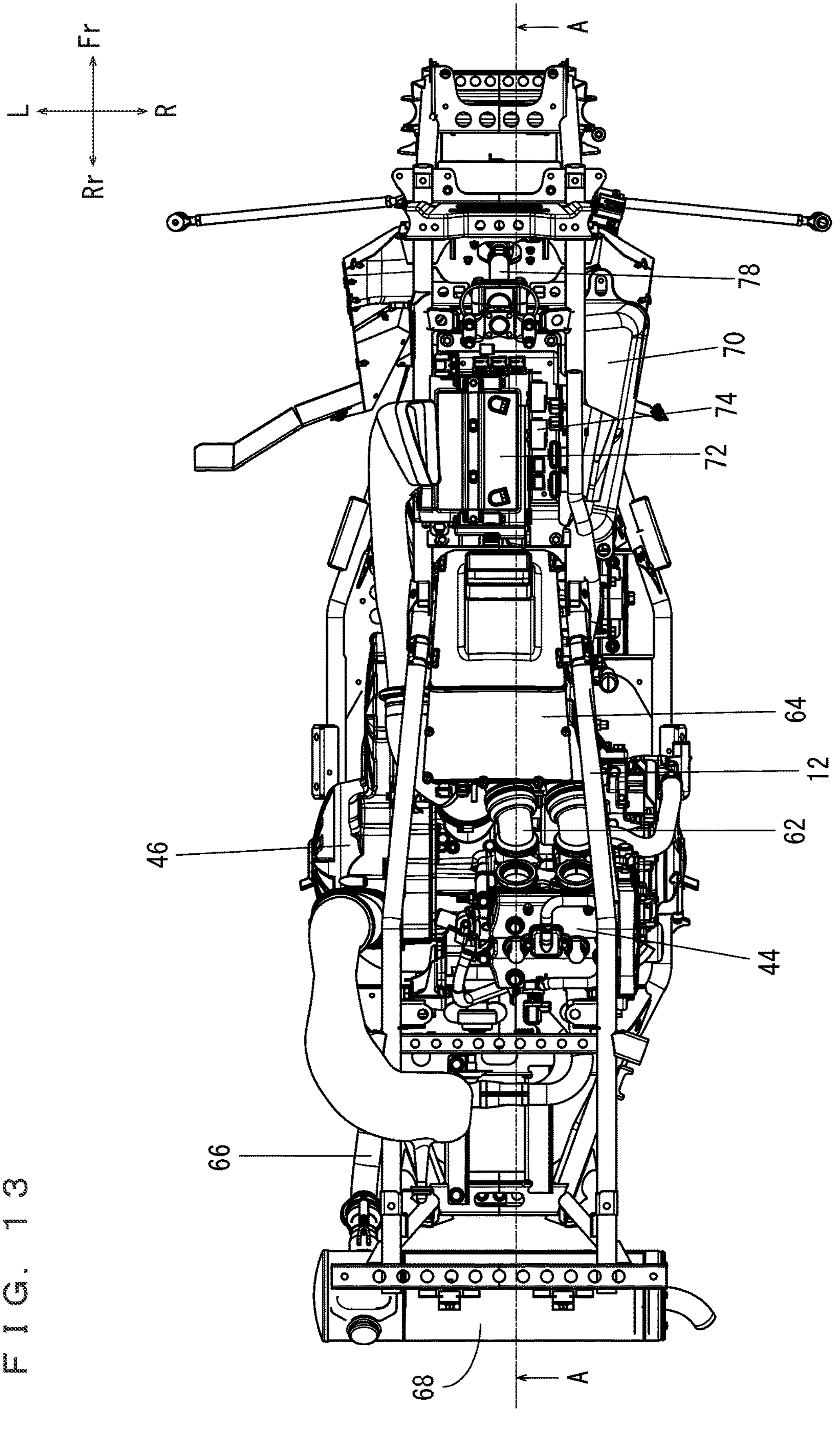
FIG. 13 is a plan view which shows an inside structure of the vehicle in FIG. 1.
Figure 14:
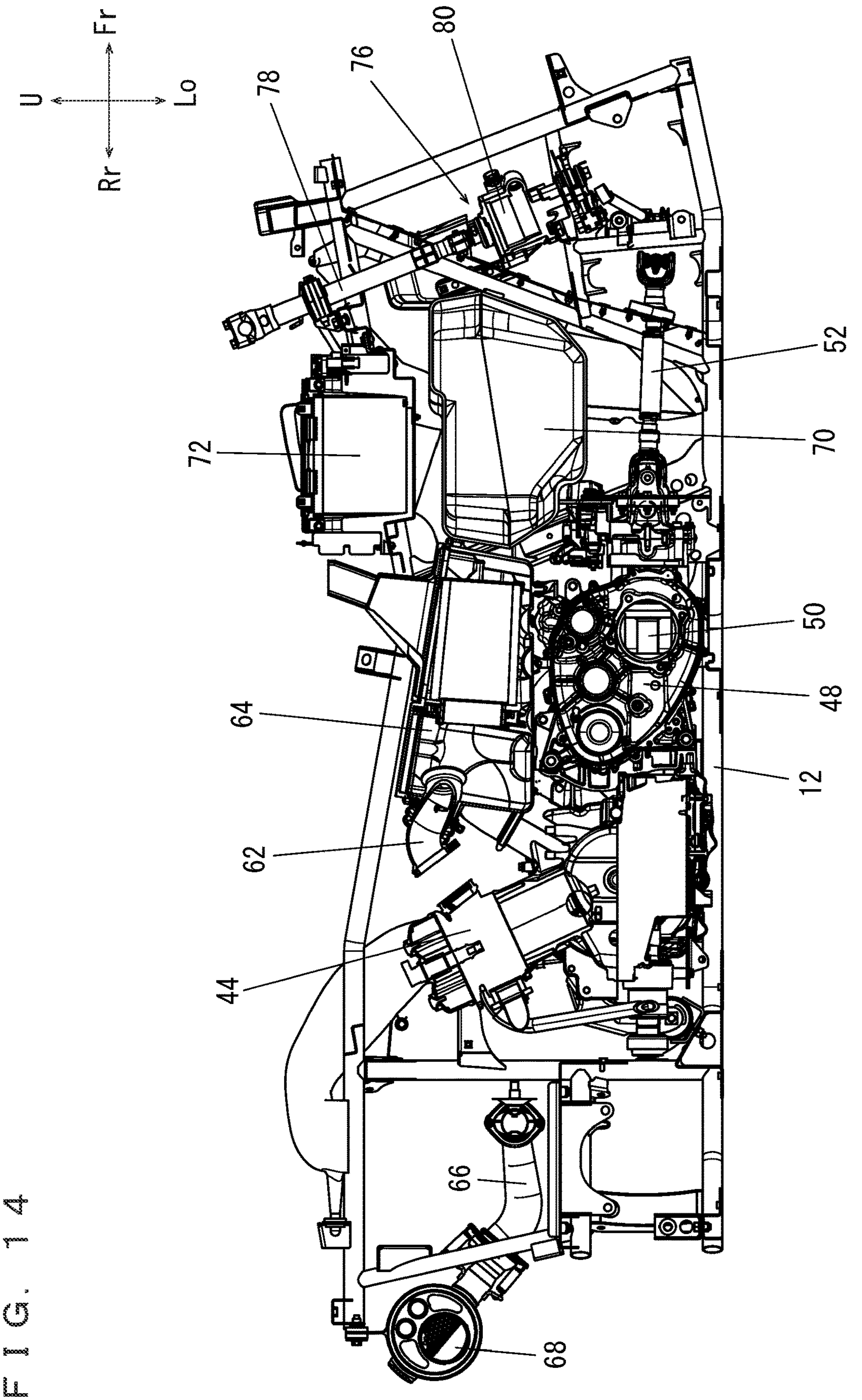
FIG. 14 is a sectional view taken in a line A-A in FIG. 13.

Referring to FIG. 13 and FIG. 14, the vehicle 10 further includes an engine 44 as a prime mover, a continuously variable transmission 46, and a transmission 48. The engine 44, the continuously variable transmission 46 and the transmission 48 are provided in the body frame 12.

In the present embodiment, the engine 44 is provided by a parallel two-cylinder engine. The engine 44 is disposed at a place slightly rearward than a center portion in a fore-aft direction of the body frame 12, with a rearward tilt. In other words, the engine 44 is laid in a rear-midship style. The continuously variable transmission 46, which receives an output from the engine 44, is provided on an outer side (left side in the present embodiment) of the engine 44. The transmission 48 is provided ahead of the engine 44 in order to speed-change an output from the continuously variable transmission 46. Therefore, the engine 44 and the transmission 48 are connected with each other via the continuously variable transmission 46.

The vehicle 10 further includes a propeller shaft 50 connected with the transmission 48 and extending in a fore-aft direction; a front shaft 52 connected with a front end portion of the propeller shaft 50 and extending in a fore-aft direction; a rotation transmission portion 54 (see FIG. 9) which transmits rotation coming from the transmission 48 via the propeller shaft 50 and the front shaft 52 to the pair of front wheels 14*a*, 14*b*; the pair of suspensions 56*a*, 56*b* which suspend the pair of front wheels 14*a*, 14*b*; a rear shaft (not illustrated) connected with a rear end portion of the propeller shaft 50 and extending in a fore-aft direction; a rotation transmission portion 58 which transmits rotation coming from the transmission 48 via the propeller shaft 50 and the rear shaft to the pair of rear wheels 16*a*, 16*b*; and the pair of suspensions 60*a*, 60*b* which suspend the pair of rear wheels 16*a*, 16*b*.

The rotation transmission portion 54 is connected with the engine 44 via the front shaft 52, the propeller shaft 50, the transmission 48 and the continuously variable transmission 46. The rotation transmission portion 58 is connected with the engine 44 via the rear shaft, the propeller shaft 50, the transmission 48 and the continuously variable transmission 46. Therefore, rotation of the engine 44 undergoes speed changes performed by the continuously variable transmission 46 and the transmission 48, and then is transmitted to the pair of front wheels 14*a*, 14*b* via the propeller shaft 50, the front shaft 52, and the rotation transmission portion 54. This rotates the pair of front wheels 14*a*, 14*b*. Also, rotation of the engine 44 undergoes speed changes performed by the continuously variable transmission 46 and the transmission 48, and then is transmitted to the pair of rear wheels 16*a*, 16*b* via the propeller shaft 50, the rear shaft, and the rotation transmission portion 58. This rotates the pair of rear wheels 16*a*, 16*b*.

The vehicle 10 further includes an air intake pipe 62 connected with the engine 44 in order to supply air into the engine 44, an air cleaner 64 connected with the air intake pipe 62, an exhaust pipe 66 connected with the engine 44 to discharge exhaust from the engine 44, and a muffler 68 connected with the exhaust pipe 66.

The air cleaner 64 is provided ahead of the engine 44 to overlap with the engine 44 in a front view, below the seat 20. The muffler 68 is provided behind the engine 44. The air intake pipe 62 is connected with a front portion of the engine 44. The exhaust pipe 66 is connected with a rear portion of the engine 44. Therefore, the engine 44 has a structure called front intake rear exhaust.

The vehicle 10 further includes a fuel tank 70 which holds fuel to be supplied to the engine 44, and a battery 72 and an electric box 74 which are provided above the fuel tank 70.

The fuel tank 70 is provided at a position diagonally forward and upward of the transmission 48, ahead of the air cleaner 64. The battery 72 and the electric box 74 are provided side by side ahead of the seat 20.

The vehicle 10 further includes a steering mechanism 76 for steering the pair of front wheels 14*a*, 14*b*.

The steering mechanism 76 includes the steering shaft 78, and an electric power steering (EPS) 80 provided on the steering shaft 78. The steering shaft 78 is provided ahead of the seat 20. The electric power steering 80 is provided ahead of the fuel tank 70.

Returning to FIG. 1 through FIG. 5, the vehicle 10 further includes a front fender 82 and a rear fender 84. The front fender 82 is provided above the pair of front wheels 14*a*, 14*b*, striding over the pair of front wheels 14*a*, 14*b*, in a plan view. The rear fender 84 is provided above the pair of rear wheels 16*a*, 16*b*, striding over the pair of rear wheels 16*a*, 16*b*, in a plan view.

In the present embodiment, the center steps 28*a*, 28*b* represent the first step and the rear steps 32*a*, 32*b* represent the second step.

According to the vehicle 10 as has been described thus far, it is possible to support the slanted portions of the footrests 22*a*, 22*b*, i.e., the rear steps 32*a*, 32*b* from below at approximate centers thereof, with the first supporting frames 34*a*, 34*b* which are connected with the main body frame 24. Therefore, it is possible to improve design freedom of the main body frame 24 and freedom in selecting a material for the footrests 22*a*, 22*b*.

Since the footrests 22*a*, 22*b* are made of a resin, it is possible to form the footrests 22*a*, 22*b* easily, in a light weight and at a low cost.

Since the first supporting frames 34*a*, 34*b* are composed as separate members from the main body frame 24, it is possible to attach the first supporting frames 34*a*, 34*b* to the main body frame 24 by means of bolt-on for example. Therefore, it becomes easy to attach/detach such components as the engine 44, leading to improved serviceability.

The stays 38*a*, 38*b* of the first supporting frames 34*a*, 34*b* extend at least outward in the vehicle's width direction from the main body frame 24 side, and then bend upward. Therefore, it is possible to widen a distance between such components as the continuously variable transmission 46 which are surrounded by the main body frame 24 and the stays 38*a*, 38*b*. This makes easy to perform maintenance tasks of the components.

The first supporting frames 34*a*, 34*b* include the footrest support portions 40*a*, 40*b* extending in a fore-aft direction. This improves stiffness of the footrests 22*a*, 22*b*.

The footrests 22*a*, 22*b* have their respective inboard end portions E1, E2 located above the main body frame 24 to overlap the main body frame 24 in a plan view. This makes it possible to support the footrests 22*a*, 22*b* further with the main body frame 24. The arrangement further improves the stiffness of the footrests 22*a*, 22*b*.

By supporting the footrests 22*a*, 22*b* further with the outside supporting frames 26*a*, 26*b*, the stiffness of the footrests 22*a*, 22*b* is further improved.

By supporting the center steps 28*a*, 28*b* from below with the second supporting frames 36*a*, 36*b*, the stiffness of the footrests 22*a*, 22*b* is further improved.

The second supporting frames 36*a*, 36*b* extend in the vehicle's width direction in order to connect the main body frame 24 with the outside supporting frames 26*a*, 26*b*. By making the second supporting frames 36*a*, 36*b* serve both in ensuring the stiffness of the main body frame 24 and the outside supporting frames 26*a*, 26*b* and in supporting the center steps 28*a*, 28*b*, it becomes possible to simplify the arrangement.

Figure 15A:
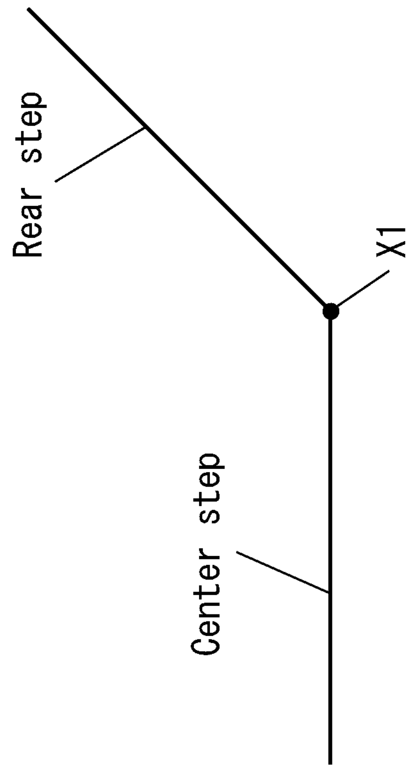
FIGS. 15A and FIG. 15B are illustrative drawings for describing a rear end of a center step and a front end (lower end) of a rear step.

It should be noted here that the rear end of the center step and the front end (lower end) of the rear step are determined as follows:

Referring to FIG. 15A, in a case where the center step and the rear step are connected with each other to form an angled bent in a side view, a point of intersection X1 between the center step and the rear step is taken as the rear end of the center step and the front end (lower end) of the rear step.

Figure 15B:
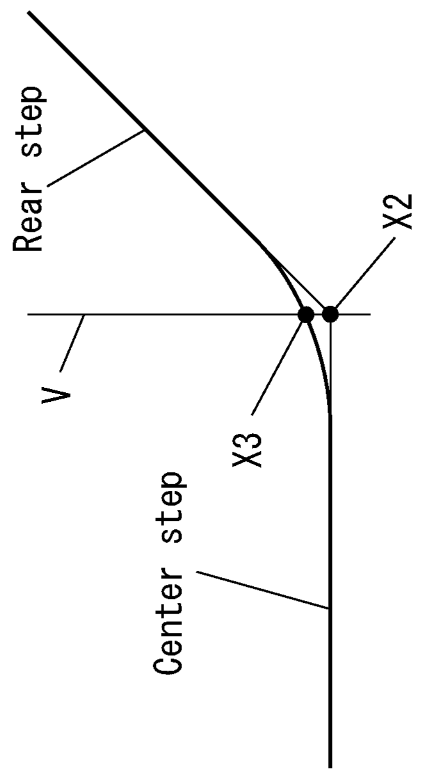

Referring to FIG. 15B, in a case where the center step and the rear step are connected with each other by a curved line in a side view, a point of intersection X2 between an extension of the center step and an extension of the rear step is obtained, using a case where the body is horizontal as a reference, and then, a point of intersection X3 made by a vertical line V which passes the intersection X2 and the curved line is taken as the rear end of the center step and the front end (lower end) of the rear step.

Also, the present invention is not limited to the case where the center step and the rear step are connected with (continuous to) each other. They may be apart from each other. A step may be provided between the center step and the rear step.

In the embodiment described above, description was made for a case where the footrests 22*a*, 22*b* have front steps 30*a*, 30*b*. However, the footrests need not necessarily have front steps.

The present invention being thus far described in terms of preferred embodiments, it is obvious that these may be varied in many ways within the scope and the spirit of the present invention. The scope of the present invention is limited only by the accompanied claims.

The invention claimed is:

1. A vehicle comprising:

a main body frame;

a seat provided on the main body frame;

a pair of front wheels provided at a front portion of the main body frame;

a pair of rear wheels provided at a rear portion of the main body frame;

a pair of footrests respectively provided on two sides of the seat in a plan view of the vehicle, each of the footrests having a first step and a second step, the second step being provided behind the first step and extending diagonally upward and rearward;

a pair of first supporting frames connected with the main body frame and supporting approximate centers of the pair of second steps from below, respectively; and a pair of outside supporting frames connected with the main body frame and supporting outboard sides of the pair of footrests, respectively, wherein the pair of first supporting frames are on an inner side of, and between, the pair of outside supporting frames in the plan view.

2. The vehicle according to claim 1, wherein each of the first supporting frames is composed as a separate member from the main body frame.

3. The vehicle according to claim 1, wherein the pair of first supporting frames each include a footrest support portion extending in a fore-aft direction of the vehicle, the pair of footrest support portions supporting the pair of second steps from below, respectively.

4. The vehicle according to claim 1, further comprising a pair of second supporting frames supporting the pair of first steps from below, respectively.

5. The vehicle according to claim 4, wherein the pair of second supporting frames extend in a width direction of the vehicle to connect the main body frame with the pair of outside supporting frames, respectively.

6. The vehicle according to claim 1, wherein the pair of first supporting frames are not directly connected to the pair of outside supporting frames.

7. A vehicle comprising:

a main body frame;

a seat provided on the main body frame;

a pair of front wheels provided at a front portion of the main body frame;

a pair of rear wheels provided at a rear portion of the main body frame;

a pair of footrests respectively provided on two sides of the seat in a plan view of the vehicle, each of the footrests having a first step and a second step, the second step being provided behind the first step and extending diagonally upward and rearward; and a pair of first supporting frames connected with the main body frame and supporting approximate centers of the pair of second steps from below, respectively, wherein each of the first supporting frames includes a stay extending outward in a width direction of the vehicle from the main body frame and then bending upward.

8. The vehicle according to claim 7, wherein the pair of first supporting frames each include a footrest support portion extending in a fore-aft direction of the vehicle, the pair of footrest support portions supporting the pair of second steps from below, respectively.

9. A vehicle comprising:

a main body frame;

a seat provided on the main body frame;

a pair of front wheels provided at a front portion of the main body frame;

a pair of rear wheels provided at a rear portion of the main body frame;

a pair of footrests respectively provided on two sides of the seat in a plan view of the vehicle, each of the footrests having a first step and a second step, the second step being provided behind the first step and extending diagonally upward and rearward; and a pair of first supporting frames connected with the main body frame and supporting approximate centers of the pair of second steps from below, respectively, wherein each of the footrests has an inboard end portion, which is located above the main body frame and overlaps the main body frame in the plan view of the vehicle.

10. The vehicle according to claim 9, wherein the pair of first supporting frames each include a footrest support portion extending in a fore-aft direction of the vehicle, the pair of footrest support portions supporting the pair of second steps from below, respectively.

* * * * *